F. W. ROBERTSHAW.
THERMOSTATIC VALVE MECHANISM.
APPLICATION FILED JUNE 30, 1914.

1,292,516.

Patented Jan. 28, 1919.
2 SHEETS—SHEET 1.

WITNESSES
R. H. Balderson
Geo. L. Robinson.

INVENTOR
F. W. Robertshaw,
by Bakewell, Byrnes, Parmelee.
Attys.

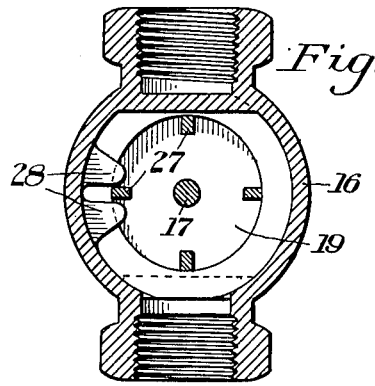
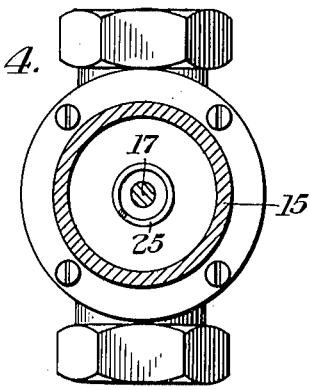
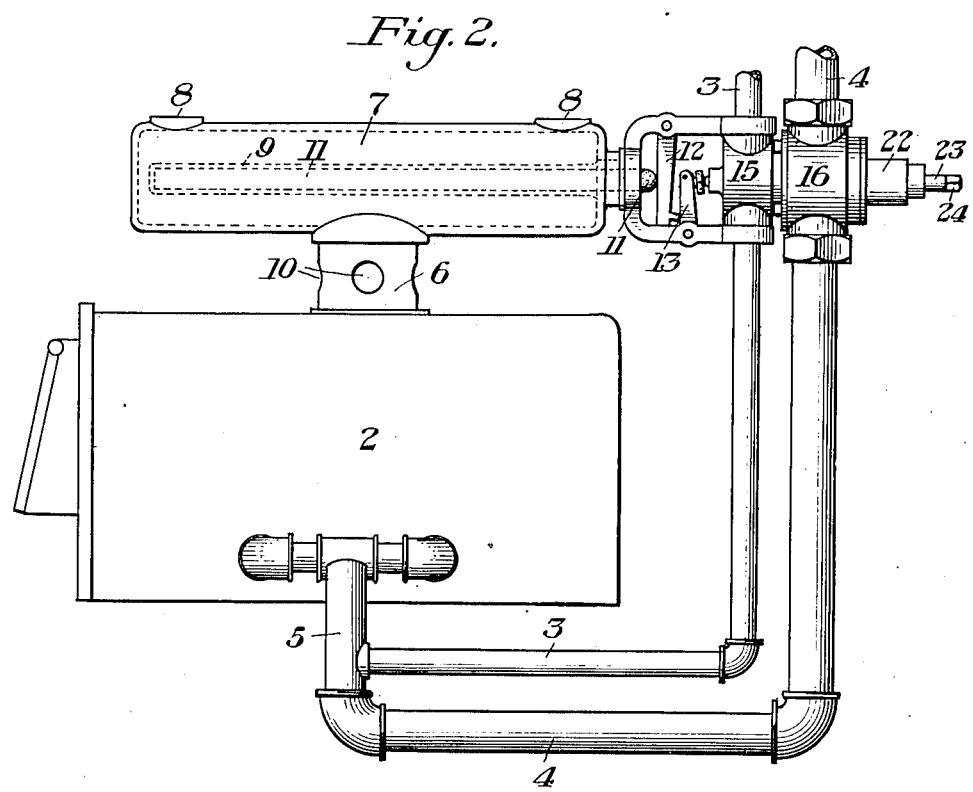

UNITED STATES PATENT OFFICE.

FREDERICK W. ROBERTSHAW, OF PITTSBURGH, PENNSYLVANIA.

THERMOSTATIC VALVE MECHANISM.

1,292,516.      Specification of Letters Patent.      Patented Jan. 28, 1919.

Application filed June 30, 1914. Serial No. 848,169.

*To all whom it may concern:*

Be it known that I, FREDERICK W. ROBERTSHAW, a citizen of the United States, and resident of Pittsburgh, in the county of Allegheny and State of Pennsylvania, have invented a new and useful Improvement in Thermostatic Valve Mechanism, of which the following is a full, clear, and exact description, reference being had to the accompanying drawings, forming part of this specification, in which:—

Fig. 2 is a front elevation, partly conventional, showing the device applied to a heater, and Figs. 3 and 4 are sections, taken, respectively, on the lines III—III and IV—IV of Fig. 1.

Figure 1:
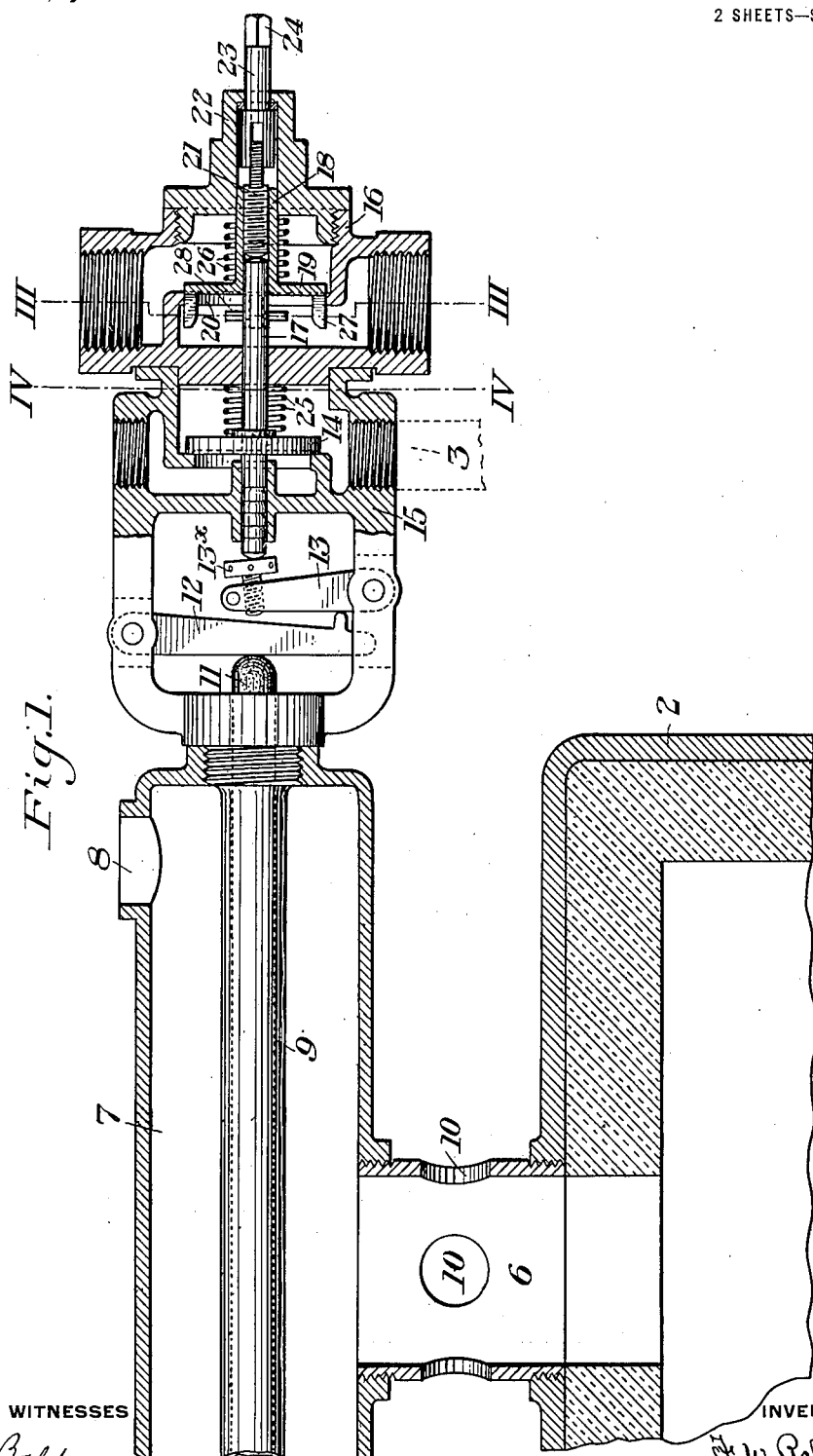
Figure 1 is a sectional view of a thermostatic valve mechanism embodying my invention and showing a portion of one form of heater to which it is applied.

My invention has relation to thermostatic valve mechanism, more particularly to mechanism of this character for controlling the air and gas supply to the burners of gas fired heaters.

The object of my invention is to provide simple, efficient and reliable mechanism of this character in which a single thermostat controls both the air and gas supply valves.

A further object of the invention is to provide means whereby relatively high temperatures may be controlled, while the thermostatic element is itself subjected to a relatively low temperature to effect the control.

The nature of my invention will be best understood by reference to the accompanying drawings in which I have shown the preferred embodiment thereof, and which will now be described, it being premised, however, that various changes may be made in the details of construction and arrangement of the parts without departing from the spirit and scope of the invention as defined in the appended claims. It will also be understood that the invention is applicable to various forms of heaters other than that shown.

In the drawings, the numeral 2 designates a heater having a gas supply pipe 3 and an air supply pipe 4, these pipes communicating with the burners of the heater through the mixing pipe 5. 6 is an escape flue for the products of combustion leading from the heater into a drum 7 having one or more offtake connections 8. 9 designates a thermostatic element which is subject to the action of the waste gases of combustion in the drum 7. The temperature of these gases will be considerably reduced before they reach this drum; and this temperature may be still further lowered by providing the connections 6 with air inlet apertures 10. In this manner, the thermostat may be made to contral relatively high temperatures while it is subject to the action of much lower temperatures. The thermostatic element may be of any well known type. It may, for instance, consist of an outer metallic tube and an inner carbon rod 11 which transmits the thermostatic movements to the multiplying levers 12 and 13. 14 designates a gas control valve placed in a casing 15 which is interposed in the gas supply pipe 3. This valve in its general character and arrangement and the manner of its operation by the thermostat through the multiplying levers is similar to that shown in my Patent No. 986,760, of March 14, 1911. In the present construction, however, another valve casing 16, interposed in the air supply pipe 4, is connected to the valve casing 15. The stem 17 of the valve 14 is extended within the casing 16 and within the hollow sleeve stem 18 of an air controlling valve 19 which is arranged to control an air port 20 through said casing. The sleeve 18 is threaded onto an adjusting stem 21 which is seated within a screw cap 22 in the outer end of the casing 16. The end of this adjusting stem is embraced by the jaws of a wrench member 23 whose projecting end portion 24 is fitted to receive an adjusting key or wrench. The valve 14 is normally held seated by means of a spring 25, and the valve 19 is held seated by means of a spring 26. Rotation of the valve 19 under the action of the wrench member 23 is prevented by lugs 27 on the valve, any one of which may be engaged by a slotted projection 28 on the casing 16 (see Fig. 3).

The operation will be readily understood. The valves 14 and 19 are set so that they will close at a predetermined maximum temperature. At temperatures below this point they will be opened to a greater or less extent by the action of the thermostat, the levers 12 and 13 acting upon the stem of the valve 14; and this stem in turn acting upon the adjusting stem 21 of the valve 19. A simultaneous and proportionate air and gas control is thereby effected.

The advantages of my invention will be apparent to those skilled in the art, since it provides a very simple and effective thermostatic control mechanism in which a single thermostat, itself subject to a relatively low temperature, may be made to simultaneously control the gas and air supply to a heater in which the temperature may be relatively high.

It will also be seen that by proper manipulation of the adjusting screw 21 and the adjusting screw 13$^x$ of the lever 13 either the gas or air valve may be adjusted independently of the other.

I claim:

1. In mechanism of the character described, the combination with air and gas supply passages, and a separate valve for controlling each passage, of a single thermostat, connections whereby one of said valves is acted upon by the thermostat, and said valve having means for actuating the other valve together with means for effecting an independent adjustment of each valve; substantially as described.

2. In mechanism of the character described, the combination with air and gas supply passages, and a separate valve for controlling each of said passages, one of said valves having its stem extended into operative engagement with the other valve, and a single thermostatic element operatively connected with the first named valve, together with means for separately adjusting the movements of the two valves; substantially as described.

3. Mechanism of the character described, comprising a heater having air and gas supply passages, and valves for controlling said passages, said heater having an outlet connection for the products of combustion, a drum in said connection and outside of the heater proper, and a thermostat within the drum and operatively connected with the said valves, said thermostat being located in the path of the outgoing products of combustion and directly exposed to the action thereof, said connection having air inlet means to reduce the temperature of the products of combustion before they act upon the thermostat; substantially as described.

4. In mechanism of the character described, the combination with air and gas supply passages and a separate valve for controlling each of said passages, said valves being capable of independent movement, of an expansible and contractible thermostatic element, means whereby movements of said element are transmitted to effect the actuation of both valves in one direction, and separate spring means for each valve for actuating it in the opposite direction, substantially as described.

In testimony whereof I have hereunto set my hand.

FREDERICK W. ROBERTSHAW.

Witnesses:
   GEO. B. BLEMING,
   W. C. LYON.